United States Patent
Hahn et al.

(10) Patent No.: US 7,834,905 B2
(45) Date of Patent: Nov. 16, 2010

(54) METHOD AND SYSTEM FOR VISUALIZING THE ENVIRONMENT OF A VEHICLE WITH A DISTANCE-DEPENDENT MERGING OF AN INFRARED AND A VISUAL IMAGE

(75) Inventors: Wolfgang Hahn, Schwabhausen (DE); Thomas Weidner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1730 days.

(21) Appl. No.: 11/013,513

(22) Filed: Dec. 17, 2004

(65) Prior Publication Data

US 2005/0110621 A1    May 26, 2005

Related U.S. Application Data

(63) Continuation of application No. PCT/EP03/004384, filed on Apr. 26, 2003.

(30) Foreign Application Priority Data

Jun. 18, 2002    (DE) ................. 102 27 171

(51) Int. Cl.
    *H04N 7/18* (2006.01)
(52) U.S. Cl. ............... 348/148; 348/159; 348/143; 348/47; 348/164; 348/187; 348/188; 348/218.1; 250/330; 250/334; 250/351; 250/252.1
(58) Field of Classification Search ............... 348/148, 348/159, 143, 47, 164, 187, 188, 218.1, 167; 250/330, 334, 351, 252.1
    See application file for complete search history.

(56) References Cited

U.S. PATENT DOCUMENTS 4,086,616 A    4/1978    Catano et al.

(Continued)

FOREIGN PATENT DOCUMENTS

DE    33 42 898 A1    6/1985

(Continued)

OTHER PUBLICATIONS

European Search Report dated Mar. 5, 2008, including an English translation of the pertinent portions (Five (5) pages).

*Primary Examiner*—Shawn An
(74) *Attorney, Agent, or Firm*—Crowell & Moring LLP

(57) ABSTRACT

The invention relates to an improved method for visualizing the environment of a vehicle, especially in the dark. The invention also relates to a night vision system, which especially provides a visual image of the environment or the digital data thereof. Preferably, the visual image is a color image which indicates the visually perceptible objects of the environment. The system also provides an infrared image of the environment or the digital data thereof. The infrared image indicates the infrared radiation radiated by the visually perceptible and/or other objections. In a preferred form of embodiment, a merged image of the visual image and the infrared image of largely identical sections of the environment of the vehicle is represented on a display comprising at least one merged region and at least one region which is not merged or not merged to the same extent or not merged with the same weighting.

34 Claims, 1 Drawing Sheet

U.S. PATENT DOCUMENTS

| | | | |
|---|---|---|---|
| 4,751,571 A | | 6/1988 | Lillquist |
| 4,967,276 A | * | 10/1990 | Murakami et al. ........... 348/164 |
| 5,001,558 A | * | 3/1991 | Burley et al. ................. 348/164 |
| 5,521,579 A | * | 5/1996 | Bernhard .................... 340/438 |
| 6,094,304 A | | 7/2000 | Wallace et al. |
| 6,150,930 A | | 11/2000 | Cooper |
| 6,516,256 B1 | * | 2/2003 | Hartmann et al. .............. 701/35 |
| 6,707,044 B2 | * | 3/2004 | Lannestedt et al. ........... 250/351 |
| 6,766,263 B1 | * | 7/2004 | Stokes .......................... 702/88 |
| 6,919,919 B2 | * | 7/2005 | Nelson et al. ................ 348/187 |
| 6,961,466 B2 | * | 11/2005 | Imagawa et al. ............. 382/190 |
| 7,015,954 B1 | * | 3/2006 | Foote et al. .............. 348/218.1 |
| 7,199,366 B2 | * | 4/2007 | Hahn et al. .................. 250/330 |
| 7,339,149 B1 | * | 3/2008 | Schofield et al. ............ 250/205 |

FOREIGN PATENT DOCUMENTS

| | | |
|---|---|---|
| DE | 691 32 203 T2 | 9/1990 |
| DE | 43 02 385 A1 | 8/1993 |
| DE | 196 38 140 A1 | 3/1998 |
| DE | 198 01 884 A1 | 7/1999 |
| DE | 100 30 421 A1 | 1/2001 |
| DE | 100 16 184 A1 | 10/2001 |
| DE | 102 18 175 A1 | 11/2003 |
| EP | 0 686 865 A1 | 12/1995 |
| EP | 1 024 057 A2 | 8/2000 |
| EP | 1 227 683 A1 | 7/2002 |
| FR | 2 687 000 | 8/1993 |
| JP | 3-99952 | 4/1991 |

* cited by examiner

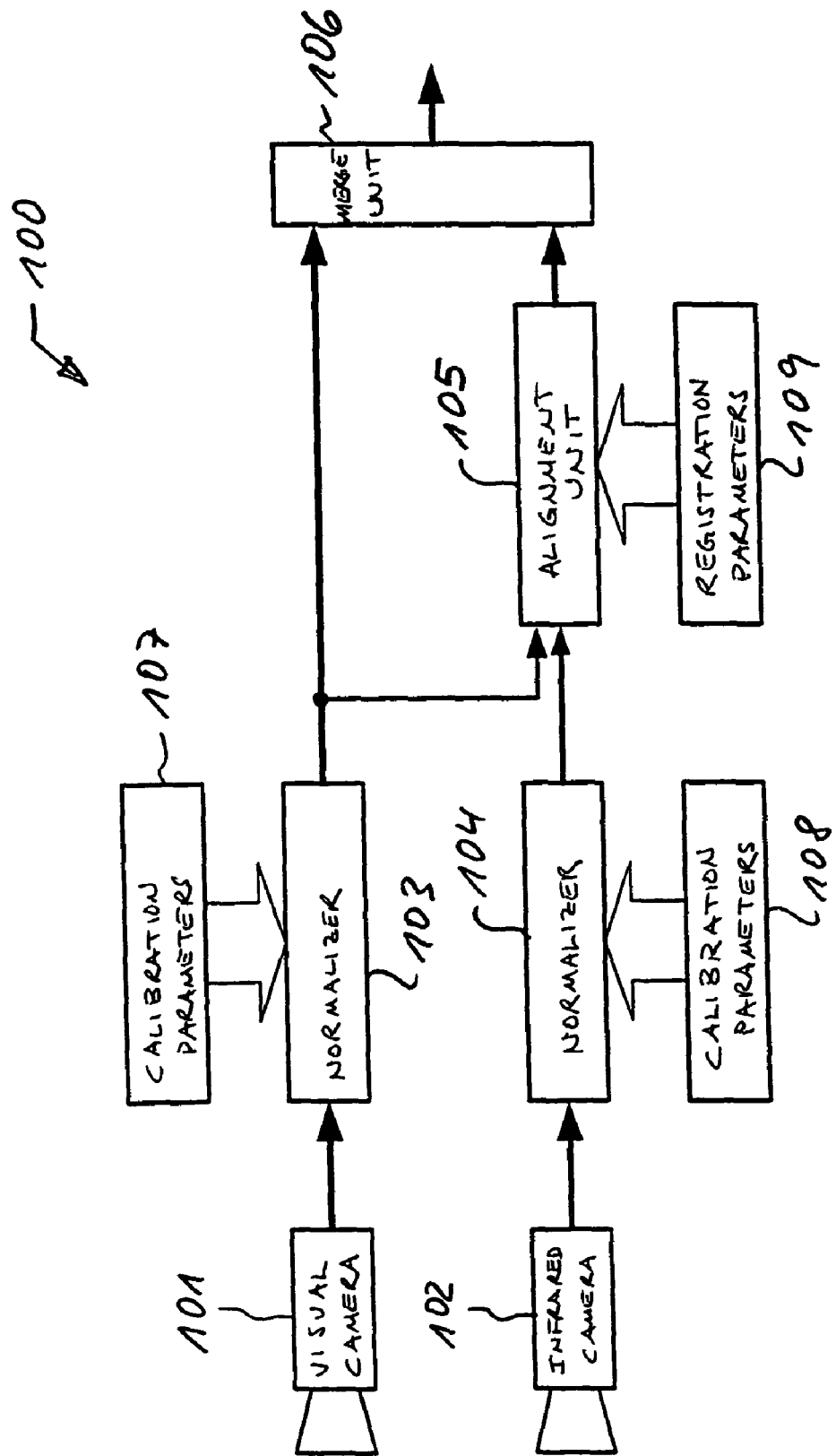

METHOD AND SYSTEM FOR VISUALIZING THE ENVIRONMENT OF A VEHICLE WITH A DISTANCE-DEPENDENT MERGING OF AN INFRARED AND A VISUAL IMAGE

CROSS-REFERENCE TO RELATED APPLICATIONS

This application is a continuation of PCT Application No. PCT/EP2003/004384 filed on Apr. 26, 2003, which claims priority to German Application No. 102 27 171.2 filed Jun. 18, 2002.

BACKGROUND AND SUMMARY OF THE INVENTION

The invention relates to a method and a system for visualizing the environment of a vehicle, as well as to a calibrating device for calibrating the system.

A night vision system for a vehicle is known from German Patent document DE 695 06 174 T2. The system has an infrared camera generating an infrared image, which shows the heat radiation emanating from persons and objects in the portion of the environment of the vehicle. The infrared image is projected by way of a head-up display on the lower portion of the windshield and is thereby made visible to the driver.

The assignment of persons and objects in the infrared image to the traffic situation situated in front of the driver and visually detectable through the windshield is to be made by the driver. Particularly in darkness, for which the known system is to be intended, this is difficult and often even impossible because the infrared image shows persons and objects which the driver cannot visually recognize. A more exact determination of the position of the persons and objects only recognizable in the infrared image is therefore not possible on a regular basis and dangerously diverts the driver's attention.

The object of the invention consists particularly of providing an improved method and an improved system for making the environment of a vehicle visible, such as particularly an improved night vision system.

The object of the invention is achieved with respect to the method by providing a visual image or its digital data of the environment, preferably a colored visual image, the visual image showing visible objects; and providing an infrared image or its digital data of the environment, the infrared image showing the infrared radiation emanating from the visible and/or other objects. And, a system is provided to implement the method. Other advantageous embodiments of the invention are described and claimed herein.

A first aspect of the invention consists of the display or visualization of a combination or superposition of a visual image, in the following called visual image, and of an infrared image of largely the same portion or cutout of the environment of a vehicle. As a result of this superposition or merging of the images of different spectral ranges of the same scene, the above-described disadvantages of the prior art are largely eliminated.

In a concrete further development of the night vision system according to the invention, the visual camera or the first sensor or their lens system has a first optical axis, and the infrared camera or the second optical sensor or their lens system has a second optical axis, which axes are spatially offset with respect to one another. The cameras or sensors therefore detect at least partially different cutouts of the environment of the vehicle, that is, a first and a second cutout. In addition, these are dependent on the distance. It is understood that, according to the invention, more than two infrared cameras or infrared sensors can be provided, whose sensitivity covers different wavelengths, and the digital images of the vehicle environment supplied by them can be superposed or merged.

In order to obtain a largely distortion-free merged image to be shown to the driver, it is provided according to a second aspect of the invention that the already provided first cutout and the already provided second cutout are completely or partially superposed or merged by a superposing or merging device with respect to pixels and/or areas. For providing the merged image, the first cutout and/or the second cutout and/or the merged image or their direct or processed digital data are adapted by at least one adaptation parameter.

This or these distance-dependent parameter(s) is/are preferably determined during the calibration of the camera system, sensor system, or night vision system for at least two distance ranges or spacing ranges between the cameras or sensors and a calibration device. It is a goal to adjust the adaptation parameter or parameters such that the merged image of objects, which forms during the superposition or merging of the images, is largely free of distortions in the respective distance range. In particularly, it should be free of ghost images or double images.

According to the invention, the adaptation parameter(s) is/are particularly at least one registration or transformation parameter. A similar parameter is known, for example, from the registration of a digital image processing system and superpositions of two images implemented thereby. The driving-situation-dependent or distance-dependent adaptation parameter(s) is/are preferably stored during the calibration in a data memory in the vehicle.

In a preferred embodiment of the invention, a first distance range corresponds to a driving situation typical of city driving, such as, in particular, a distance range of from approximately 15 to 75 m.

As an alternative or in addition, a second distance range corresponds to a driving situation typical of highway driving, such as, in particular, a distance range of from approximately 30 to 150 m.

As a further alternative or in addition, a third distance range corresponds to a driving situation typical of expressway driving, such as, in particular, a distance range of from approximately 50 to 250 m.

It is understood that, as an alternative or in addition to the above-mentioned distance-dependent or distance-range-dependent adaptation parameters, also other driving-situation-dependent adaptation parameters can be determined, particularly with the above-mentioned goal. These may, for example, be suitable adaptation parameters for driving while the sun is low, in fog, at dusk or in darkness.

A third aspect of the invention consists of automatically determining the actual driving situation of the vehicle and of providing the adaptation parameter(s) for use by an aligning device according to the invention, or for use by the superposing or merging device. The adaptation parameter(s) which correspond(s) to the actual driving situation, is/are obtained by calibration and is/are stored in the vehicle. The superposing or merging device carries out a pixel-type and/or area-type superposition or merging of the visual image, present in the form of digital data, and of the infrared image, in which case one or more distance-dependent adaptation parameter(s) influence(s) the infrared image and/or the visual image and/or the merged image such that, preferably, a largely distortion-free and/or ghost-image-free merged image of the environment is provided to the driver.

As an alternative or in addition to the above-mentioned automatic determination, in one embodiment of the invention, it is provided that the driver selects adaptation parameters which seem appropriate to him. The parameters are obtained particularly by calibration and are stored in the vehicle for use by the aligning device according to the invention or by the superposing and merging device. Thus, for example, the adaptation parameter or parameters for a driving situation typical of city driving, typical of highway driving, or typical of expressway driving, can be offered to the driver for a selection, for example, in the form of a manual selection possibility or by voice input. Thus, even without any vehicle navigation system situated in the vehicle, the driver is enabled to himself create a largely distortion-free or double-image-free merged image for the respective driving situation. In addition, the driver is offered the possibility of overcoming a possible automatic selection. Likewise, the driver can be provided with the possibility of selecting one or more adaptation parameters, which parameters display to him the close environment of his vehicle free of distortions in the merged image, for example, distances of up to 20 m from his vehicle. The driver can make this selection, for example, when he is approaching his garage in the dark and wants to find out by way of the infrared information in the merged image whether anyone is lying in wait for him behind a bush.

In a preferred embodiment of the invention, the actual position of the vehicle is determined by a vehicle navigation system, particularly a satellite navigation system. Using the position, the navigation system situated in the vehicle automatically determines, by use of the comparison with digital map data, the corresponding street or road category or driving situation, particularly a city street, highway or expressway. Such vehicle navigation systems already exist today in numerous vehicles for the purpose of routing, etc. and can be utilized without high expenditures for the above-mentioned automatic driving-situation-dependent optimization of the merged images of the environment of the vehicle.

As an alternative or in addition, it is provided in another embodiment of the invention that the driving situation is determined by use of at least one parameter of the driving dynamics, such as particularly the vehicle speed and/or the operation of the low beam or high beam and/or the vehicle acceleration and/or brightness and/or fog. This information can already be provided in today's vehicles completely or partially by its onboard power supply without requiring significant expenditures.

In a preferred embodiment of the invention, a colored visual image is merged, combined or superposed with the infrared image. In contrast to a black-and-white visual image, a merged image is created which contains the color information of the visual image, such as red brake lights of a vehicle driving ahead, a red traffic light, a colored traffic sign, or the like. The color information in the merged image facilitates the fast orientation and detection of the traffic situated illustrated in the merged image for the driver of a correspondingly equipped vehicle. In addition, the color information reduces the risk that colored warning signs (red traffic light, etc.) are overlooked.

Summarizing, the images of the environment or scene for different spectral ranges are in each case free of disturbing influences, such as distortions of the infrared or visual image, particularly because of imaging faults of the respectively used lens system, etc. With respect to the software, this preferably takes place by known measures for processing digitized images. The images or their digital image data, substantially free for the most part of disturbing influences, are preferably aligned with one another or caused to coincide with one another by digital image processing, so that largely isochronous and congruent image pairs consisting of the infrared and the visual image, or of their digital data, are present. According to the invention, this takes place by using at least one distance-dependent and/or driving-situation-dependent adaptation parameter for causing a distortion-free merged image. The software and hardware used for the digital image processing preferably permits a displacement, rotation, and scaling of the images relative to one another. As a result of this processing, the subsequent hardware expenditures for superposing or merging the images from different spectral ranges in a cost-effective manner—despite extensive real-time processing of isochronous and congruent image pairs—can be minimized.

According to a preferred embodiment of the invention, the infrared images and the visual images are generated with a respectively identical image repetition rate, preferably by one or two cameras or sensors for these spectral ranges. Isochronous image pairs can thereby be created in a particularly simple manner from the infrared image and the visual image, which considerably reduces the software and hardware expenditures for the subsequent superposing or merging of the two images according to the invention—largely in real time. The processing speed of the image pairs rises; and, the costs for semiconductor memory for the intermediate storage of the images are minimized.

In a preferred embodiment of the invention, the infrared image shows the infrared radiation or thermal radiation emitted by persons and objects, which is in the wavelength range of approximately 8 to 14 mm. An IR camera or an IR sensor is preferably used which is sensitive in a range of from approximately 8 to 10 mm. As a result, advantageously an infrared radiator or such an illumination (typical wavelength range of from approximately 800 nm to 2.5 mm) for the vehicle environment can be eliminated. A mutual blinding of oncoming vehicles, which in a known manner are each equipped with infrared lighting, does not occur. Likewise, the infrared image according to the invention is not limited to the range of an infrared lighting.

As an alternative or in addition, it is provided according to a fourth aspect of the invention that the method according to the invention and the system according to the invention, respectively, permit the showing of a merged image consisting of the visual image and the infrared image of the largely identical cutout of the environment of a vehicle in a display, which display has at least one merged area and at least one non-merged area, or an area not merged to the same extent or with the same weighting.

This fourth aspect according to the invention is based particularly on the following considerations and measures. The environment situated in front of the vehicle, as a rule, has numerous objects, the objects normally having different distances from the vehicle.

The following driving situation will now be considered as an example. A vehicle driving ahead on a highway at a close range of from 10 to 25 m has a shorter distance from the cameras of a following vehicle equipped according to the invention than an area of the right shoulder situated in the dark on which—in a not visible manner—pedestrians are situated farther toward the front. As mentioned above, the adaptation parameters suitable per se for the highway drive (typical distance range approximately 30 to 150 m) for the avoidance of ghost images or double images are used in the case of the method according to the invention and by the system according to the invention, respectively. Without any further influencing of the described merging of the visual image and of the infrared image, a merging image shown in the display is obtained whose center (or image center) shows the visual image of the vehicle driving ahead as well as an infrared image of the vehicle driving ahead which is at least partially spatially separate therefrom; that is, a ghost image or double image of the visual image is shown which irritates the driver. In contrast, the objects (for example, the pedestrians) situated within the range of from approximately 30 to 150 m are shown in the display largely without distortions or ghost images.

According to the invention, those areas of the merging image are not formed or merged or are formed or merged only to a reduced degree from the visual image and the infrared image which represent objects situated outside that distance range for which the actually used adaptation parameters are suitable. Thus, in the above-mentioned case, a merged image is created in the display which, in the center or image center, shows the visual image or the infrared image of the vehicle driving ahead (now without the double image) and around it, the merged image of the objects, such as the pedestrians, situated in the range of from 30 to 150 m, without ghost images.

In a first embodiment of the invention according to the fourth aspect, it is provided to measure the distance of the object driving ahead, for example, by means of radar, lidar (light detection and ranging) or ultrasound. According to a first variant, it is checked whether the determined spacing falls into the spacing range of the actually used adaptation parameters (for example, for highway driving). If so, no distortion is to be expected; that is, the merging can take place in the above-described manner. If not, the object or the concerned distance range, in a first variant, is shown in the display in the form of its visual image or its infrared image. If not, the object or the concerned distance range, in a second variant, is shown in the display by a partially merged image, the partially merged image being formed of the visual image and the infrared image of the object while using first adaptation parameters, and the remaining merged image or part thereof being formed by using second adaptation parameters. In the above-mentioned example, the first adaptation parameter or parameters is/are suitable for the distance of the vehicle driving ahead (approximately 10 to 25 m), and the second adaptation parameter or parameters is/are suitable for highway driving (approximately 30 to 150 m); that is, the result is again a distortion-free merged image (without areas not formed by merging) in the display.

It is understood that the change of the adaptation parameters used from one partially merged image to another partially merged image of the entire merged image illustrated in the display does not necessarily have to take place abruptly; to the contrary, it may be expedient to carry out the change in a flowing manner in order to obtain a largely distortion-free merged image of the objects consisting of different distance ranges (environment of the vehicle).

The use of radar, lidar or ultrasound for determining the distance is advantageous because corresponding transmitting and receiving devices are already available in modern vehicles for the ACC (automatic cruise control by radar or lidar) or for the purpose of parking in parking spaces (ultrasound).

It is understood that, as an alternative or in addition, it can be achieved by digital image processing that the adaptation parameter or parameters is/are varied in a suitable manner when merging the visual image and the infrared image for providing a distortion-free image of the environment of the vehicle (with objects in different distance ranges) in the display or the like.

The use of the above-mentioned transmitting and receiving devices for determining the distance, particularly of a vehicle driving ahead, should be advantageous in that the computing expenditures, and thus the hardware expenditures, for the digital image processing can be reduced in a cost-effective manner in the case of the method according to the invention and in the case of the system according to the invention, respectively.

Other objects, advantages and novel features of the present invention will become apparent from the following detailed description of the invention when considered in conjunction with the accompanying drawings.

BRIEF DESCRIPTION OF THE DRAWING

FIG. 1 is a block diagram of a system according to the invention for visualizing a cutout of the environment of a vehicle or a night vision system by which the visualizing method according to the invention is described.

DETAILED DESCRIPTION OF THE DRAWING

The system according to the invention illustrated as a block diagram in FIG. 1 (the night vision system) 100 has an electronic camera (here, a so-called "visual camera") 101 such as a CCD sensor, operating in the visual spectral range, an electronic infrared camera 102, such as an IR sensor, sensitive in the infrared spectral range of from approximately 8 to 10 mm, a first normalization device 103, a second normalization device 104, an aligning device 105, and a superposing or merging device 106. The visual camera 101 supplies a color visual image.

The optical axes of the cameras 101 and 102 are, preferably, aligned parallel to one another, whereby the parallel axis error can be minimized, and are preferably situated close to one another, whereby offset errors are minimized. The image planes of both cameras or sensors are preferably aligned parallel to one another and perpendicular to the optical axis and are situated close to one another. The photo-sensitive sensor surfaces of both cameras or sensors are preferably neither rotated nor tilted relative to one another but are arranged largely parallel to one another. Both cameras or sensors preferably have the same opening angle. As a result of these measures, it can be achieved that the cameras or sensors supply images of different spectral ranges, which show largely the same cutout or portion of the environment and are not rotated relative to one another and to the actual situation. This can clearly reduce expenditures for processing the images in order to provide a merged image from both images and, thus, reduce the hardware and software expenditures.

The optical surfaces of the cameras are preferably hydrophobically coated. Preferably, a high-pressure nozzle or the like, as is customary for cleaning headlights, is provided for cleaning the optical surfaces. Both cameras are preferably installed in a common housing (easy mounting, overall alignment with respect to the vehicle axis, no mutual displacement of optical parameters of the cameras). Fastenings are preferably arranged on the housing of the cameras, which fastenings ensure a low-vibration operation of the cameras on or in the vehicle. For the operation of the cameras, connections for the operating voltage are provided. The operating voltage of the cameras should be flexibly adaptable to the respective onboard power voltage, such as 12 volts and/or 42 volts. In order to protect the electronic system and the sensor of the cameras from damage, an overload protection and a reverse battery protection are preferably installed in the operating voltage circuit. The output of the video signals generated by the cameras or sensors (spectral ranges separate or already merged) should be oriented according to a standard (such as NTSC, PAL, SECAM or one's own standard). Existing semiconductor elements can be used as digital-to-analog converters. For the visualization of the driving environment, the cameras or sensors can be mounted in front of, behind, or laterally with respect to the vehicle body.

In the following, the calibration of the night vision system or of the system 100 will be described in detail. For the calibration, a calibrating device according to the invention (not shown) is used. The latter has several incandescent lamps which are preferably arranged in a checker-board-type manner. Incandescent lamps are characterized in that they emit thermal radiation as well as visible radiation. Preferably, a plate or the like, equipped with several incandescent lamps, is successively arranged at different distance ranges in front of both cameras or sensors 101 and 102. The distance ranges are typical driving-situation-dependent distance ranges, which will be explained in detail in the following.

The calibrating device, which is situated in front of the cameras 101 and 102, and which is preferably arranged in a dark environment and not in the vicinity of heat sources, generates a (so-called) visual image in the visual camera 101, which visual image shows the incandescent lamps arranged in a checkerboard-type manner, as also seen by the human eye. Further, the calibrating device generates a heat image in the infrared camera 102, which heat image also shows the arrangement of the incandescent lamps. Typically, particularly because of optical imaging faults, etc., the visual image as well as the infrared image show distortions at the edges of the respective image. In a known manner, the distortions or imaging faults in the visual image are largely eliminated by a first normalization device 103. In a known manner, the distortions or imaging faults in the infrared image are largely eliminated by means of a second normalization device 104. The normalization or fault elimination preferably takes place by known software-related measures performed on the digital data of the images (digital image processing) by using calibration parameters 107 for the visual image and calibration parameters 108 for the infrared image.

The normalized images (or images largely free of disturbances, etc.), or their digital data are aligned with respect to one another by a registration operation known per se in digital image processing by the use of an aligning device 105 in conjunction with registration parameters 109. During the aligning operation, one of the images, preferably, remains unchanged and is used as a reference for the other image. The second image is changed in its size and position such that an image is created which has largely identical objects relative to the first image.

The normalized images are therefore aligned relative to one another such that one and the same object appears largely in the same location and in largely the same size in the merged image. If this preprocessing step is not carried out, ghost, double, shadow or twin images will occur because of different camera geometries and of the camera offset. This means that an object appears at two locations and in different sizes in the merged image. The viewer is more irritated than helped by such an image.

For the driving-situation-dependent optimization of a merging, which is precise with respect to pixels or ranges, a first registration operation is carried out for a driving situation which is typical of city driving. For this purpose, the distance between the calibrating device and the cameras 101 and 102 is varied, for example, in the range of from approximately 15 to 75 m, and the registration parameter or parameters suitable for this distance range is/are determined and stored. Correspondingly, a second registration operation is carried out for a driving situation typical of highway driving, that is, for example, a range of from approximately 30 to 150 m. Finally, in a corresponding manner, a third registration operation is carried out for a driving situation typical of expressway driving, that is, for example, in the range of from approximately 50 to 250 m.

Using the actual position data provided by a vehicle navigation system (not shown), the system determines through the use of the digital map data the street/road category or driving situation corresponding to the position of the vehicle, such as a city street, highway or expressway. Particularly in darkness, the registration or adaptation parameters, which correspond to the driving situation and are stored in the vehicle during the calibration operations, are used by the superposing or aligning device 105 for the alignment of the images corresponding to the driving situation. Thus, particularly double images, shadow images or twin or ghost images in the merged image are largely avoided for the corresponding driving situation.

As an alternative or in addition, the actual driving situation of the vehicle is determined by use of at least one quantity relating to driving dynamics. According to the invention, the registration or adaptation parameters assigned to the quantity or quantities relating to driving dynamics and stored in the vehicle are used by the superposing or aligning device 105 for the alignment of the images corresponding to the driving situation. Also as a result of this measure, particularly shadow, or twin or ghost images in the merged image are largely avoided for the corresponding driving situation. The quantities relating to the driving dynamics of the vehicle are particularly its speed, the switching-on of the low beam or high beam, or its positive or negative acceleration.

The above-mentioned alignment of the normalized images can be divided into three steps: The displacement, the rotation and the scaling. In practice, it was found that the rotation, scaling and displacement sequence qualitatively had the best results. Since the sequence of these steps is generally not commutative or exchangeable, attention should be paid to the fact that the sequence of these steps is the same during the calibration and during the subsequent operation of the night vision system according to the invention. If necessary, the calibrating and/or operating software of the night vision system should be designed correspondingly.

The mutually aligned images are superposed or merged in a superposing or merging device 106 with respect to the software by the processing of their digital data. From each image pair which is identical with respect to the time and the location or the object and which consists of the visual image and the infrared image, a merged or superposed image is generated, which is displayed to the driver of the vehicle preferably on a color monitor in the vehicle (or another display).

A merging of the image pairs identical with respect to the time and the location, which consist of a visual image and an infrared image, preferably takes place on the basis of individual, mutually assigned pixel pairs consisting of two images or using several pixels from both images. In particular, this can depend on which resolution is desired and/or which computing power is available for the digital image processing. The images preprocessed as described above are superposed by the digital processing of their image data and displayed. With respect to the result, this process can be compared approximately to the superposing of foils or slides of the same scene or driving environment. With respect to computing or in the case of digital image processing, this is achieved by averaging the pixel information, particularly by taking into account their brightness in the respective images and the color information contained in the visual image and/or in the infrared image. This does not necessarily have to take place for each pixel, but can also occur by averaging for pixel ranges identical with respect to location and time in both images.

In addition, it may make sense to weight the pixel information in the infrared image during averaging differently than the pixel information identical with respect to time and location in the visual image. This different weighting can take place, for example, as a function of the daylight and/or the weather and/or as a function of the light from the headlights of the motor vehicle and/or as a function of the color in the visual image. As a result, it can, for example, be achieved that a red traffic light is particularly clearly recognizable in the merged image.

As a result of this approach, individual image areas can be particularly emphasized. Thus, for example, the immediate driving range of the vehicle can be emphasized more in order to achieve a good guidance of the driver.

With increasing darkness, the weighting of the infrared information with respect to the visual information could increase when averaging. When the dimmed beams are switched on, the weighting of the infrared information could be increased with respect to the visual information in comparison to switched-on high beams.

Likewise, the information content of a range in the respective image could also determine the weighting. If the information content in the range of the visual image identical with respect to the time and the location is, for example, higher than in the same range of the infrared area, it may make sense to take this into account when averaging by using a higher weighting of the visual information.

As described above, the images generated by the cameras or sensors have to be preprocessed in order to be aligned in a manner which is equalized and true with respect to the objects. In order to save memory, which is cost-intensive, the software algorithm preferably accesses the sensor information of the cameras 101 and 102 by pixels.

The devices for performing the digital image processing illustrated in FIG. 1 are all (or partially preferably one or more) software-controlled digital processors, which preferably were optimized for the digital image processing in real time. It is, however, also contemplated to use one or more software-controlled PC processors in a cost-effective manner if their processing speed permits an extensive real-time processing of the images for providing a merged image with visual and infrared information.

The following driving situation will now be considered as an example. A vehicle driving ahead in the close range of from 10 to 25 m on a highway has a shorter distance from the cameras of a following vehicle equipped according to the invention than an area on the right shoulder which is situated in the dark and on which—in a not visible manner—pedestrians are situated farther toward the front. It is assumed that the adaptation parameters for avoiding ghost images or double images, which are suitable per se for highway driving (typical distance range approximately 30 to 150), are used by the night vision system 100. Without any further influencing of the described merging of the visual image and of the infrared image, as a result of the night vision system 100, a merged image is obtained whose center or image center shows the visual image of the vehicle driving ahead, as well as an infrared image of the vehicle driving ahead which is at least partially spatially separate therefrom; that is, a ghost image or double image of the visual image which irritates the driver. In contrast, the objects (for example, the pedestrians) situated within the range of from approximately 30 to 150 m are shown in the display largely without distortions or ghost images.

In a first embodiment of the invention, the distance of the object or vehicle driving ahead is measured by the following vehicle equipped with the night vision system 100, for example, by means of radar, lidar (light detection and ranging) or ultrasound. For this purpose, the vehicle which is following is equipped with a corresponding transmitting and receiving device.

The night vision system 100 now checks by means of a comparison implemented therein (not shown) whether the determined distance falls into the distance range of the actually used adaptation parameters (in this example, suitable for highway driving).

If so, no distortion is to be expected; that is, the merging can take place in the above-described manner by the night vision system 100.

If not, the object is shown by the night vision system 100 in a preferred embodiment of the invention in the display (not shown) in the form of its visual image or its infrared image. Thus, in the above-mentioned case, particularly a merged image is created in the display which, in the center or image center, shows the visual image or the infrared image of the vehicle driving ahead (now without the double image) and around it, the merged image of the objects, such as the pedestrians, situated in the range of from 30 to 150 m, without ghost images.

If not, the object or the concerned distance range, in a second embodiment of the invention, is shown in the display by a partially merged image, the partially merged image being formed by merging the visual image and the infrared image of the object while using first adaptation parameters, and the remaining merged image, or part thereof, being formed by using second adaptation parameters by the night vision system 100 (not shown). In the above-mentioned example, the first adaptation parameter or parameters is/are suitable for the distance of the vehicle driving ahead (approximately 10 to 25 m), and the second adaptation parameter or parameters is/are suitable for highway driving (approximately 30 to 150 m); that is, the result is again a distortion-free merged image of the vehicle driving ahead and of the environment of the following vehicle in the display (not shown).

It is understood that changing the adaptation parameters used from one partially merged image to another partially merged image of the entire merged image illustrated in the display does not necessarily have to take place abruptly; to the contrary, it may be expedient to carry out the change in a smooth or flowing manner in order to obtain a largely distortion-free merged image of the objects consisting of different distance ranges (environment of the following vehicle).

In an alternative or supplementary embodiment of the invention, measures are provided which are known per se from digital image processing and in which the adaptation parameter or parameters during the merging of the visual image and the infrared image for providing a distortion-free image of the environment of the vehicle (with objects at different distance ranges) on the display or the like are varied analogous to the preceding explanation.

The use of the above-mentioned transmitting and receiving devices for determining the distance to one or more objects, particularly of a vehicle driving ahead, should have the advantage with respect to the above-mentioned embodiment that the computing expenditures and, thus, the hardware expenditures for the digital image processing can be reduced in a cost-effective manner in the case of the method according to the invention and the system according to the invention respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of visualizing an environment of a vehicle in darkness, the method comprising the acts of:
providing a visual image or its digital data of the environment, preferably a colored visual image, the visual image showing visible objects; and
providing an infrared image or its digital data of the environment, the infrared image showing the infrared radiation emanating from the visible and/or other objects;
wherein the visual image or its digital data are provided by a visual camera sensitive in a visual spectral range, preferably a color-sensitive visual camera, or a first sensor, and the infrared image or its digital data are provided by an infrared camera sensitive in the infrared spectral range or a second sensor;
wherein the visual camera or the first sensor or its lens system has a first optical axis, and the infrared camera or the second optical sensor or its lens system has a second optical axis, which are offset parallel to one another so that the cameras or sensors provide at least partially different cutouts of the environment of the vehicle in the form of a first and a second cutout;
wherein the provided first cutout and the provided second cutout are completely or partially superposed or merged by a superposing or merging device with respect to pixels and/or areas, and wherein during the merging at least one distance-dependent adaptation parameter obtained during calibration for different distances, particularly at least one registration or transformation parameter, is taken into account, and the adaptation parameter or parameters are stored during the calibration in a data memory in the vehicle; and
wherein the distance between the vehicle and a vehicle driving in front of it is determined by a transmitting and receiving device and it is checked by the superposing or merging device whether the actually used distance-dependent adaptation parameter is suitable for the determined distance for providing a ghost-image-free merged image and, in the event of a lacking suitability, at least one additional suitable distance-dependent adaptation parameter is determined and the latter is used for providing a partially merged image which shows the vehicle driving ahead.

2. Method according to claim 1, wherein the at least one distance-dependent adaptation parameter is obtained by a first calibration for a first distance or a first distance range and at least one additional calibration for at least one other distance or one other distance range.

3. Method according to claim 2, wherein the first distance or the first distance range corresponds to a driving situation typical of city driving, particularly a distance range of from approximately 15 to 75 m.

4. Method according to claim 3, wherein a second distance range corresponds to a driving situation typical of highway driving, particularly a distance range of from approximately 30 to 150 m.

5. Method according to claim 4, wherein a third distance or a third distance range corresponds to a driving situation typical of expressway driving, particularly a distance range of from approximately 50 to 250 m.

6. Method according to claim 3, wherein a third distance or a third distance range corresponds to a driving situation typical of expressway driving, particularly a distance range of from approximately 50 to 250 m.

7. Method according to claim 2, wherein a second distance range corresponds to a driving situation typical of highway driving, particularly a distance range of from approximately 30 to 150 m.

8. Method according to claim 7, wherein a third distance or a third distance range corresponds to a driving situation typical of expressway driving, particularly a distance range of from approximately 50 to 250 m.

9. Method according to claim 2, wherein a third distance or a third distance range corresponds to a driving situation typical of expressway driving, particularly a distance range of from approximately 50 to 250 m.

10. Method of visualizing an environment of a vehicle in darkness, the method comprising the acts of:
providing, by a visual camera, a visual image or its digital data of the environment, preferably a colored visual image, the visual image showing visible objects;
providing, by an infrared camera, an infrared image or its digital data of the environment, the infrared image showing the infrared radiation emanating from the visible and/or other objects; and
merging or superposing, by a superposing or merging device, the visual image and the infrared image during which a merged image is created which has at least a first merged image area and a second merged image area, the first merged image area being formed by using at least a first distance-dependent adaptation parameter, and the second merged image area is formed by using at least a second distance-dependent adaptation parameter,
wherein the distance between the vehicle and a vehicle driving in front of it is determined by a transmitting and receiving device and it is checked by the superposing or merging device whether the actually used distance-dependent adaptation parameter is suitable for the determined distance for providing a ghost-image-free merged image and, in the event of a lacking suitability, at least one additional suitable distance-dependent adaptation parameter is determined and the latter is used for providing a partially merged image which shows the vehicle driving ahead.

11. Method according to claim 10, wherein infrared radiation emanating from the visible objects and/or the additional objects, and detected, has a wavelength in the range of from approximately 7 to 14 mm, preferably approximately 7.5-10.5 mm.

12. Method according to claim 10, wherein infrared radiation emanating from the visible objects and/or the additional objects, and detected, has a wavelength in the range of from approximately 3 mm to approximately 5 mm.

13. Method according to claim 10, wherein infrared radiation emanating from the visible objects and/or the additional objects and detected has a wavelength in the range of from approximately 800 nm to approximately 2.5 mm.

14. Method according to claim 10, wherein the visual image of the environment of the vehicle present in the form of digital data is normalized by using a calibrating device.

15. Method according to claim 14, wherein infrared image of the cutout of the environment present in the form of digital data is normalized by using the calibrating device.

16. Method according to claim 15, wherein the calibrating device emits visible radiation and infrared radiation.

17. Method according to claim 16, wherein the calibrating device has several incandescent lamps arranged in a checkerboard-type manner.

18. Method according to claim 15, wherein the calibrating device has several incandescent lamps arranged in a checkerboard-type manner.

19. Method according to claim 15, wherein infrared pixels and visual pixels or such pixel areas are weighted differently.

20. Method according to claim 14, wherein the calibrating device has several incandescent lamps arranged in a checkerboard-type manner.

21. Method according to claim 14, wherein infrared pixels and visual pixels or such pixel areas are weighted differently.

22. Method according to claim 21, wherein regions with large amounts of information in comparison to regions with small amounts of information of the visual image and/or of the infrared image are weighted higher during the superposition or averaging.

23. A system for visualizing an environment of a vehicle in darkness, wherein the system implements the method according to claim 10.

24. The system according to claim 23, comprising the visual camera that is a color visual camera, the infrared camera, a first normalization device for normalizing a colored visual image of a cutout of the environment of the vehicle provided by the color visual camera, a second normalization device for normalizing the infrared image of the cutout of the environment of the vehicle provided by the infrared camera, an aligning device for generating image pairs identical with respect to time and location from visual images and infrared images, and the superposing or merging device which superposes the image pairs largely identical with respect to time and location in a pixel-type or area-type manner and/or forms average values.

25. A calibrating device for calibrating a system according to claim 24, the calibration device having at least one radiation source, which source emits visible radiation as well as infrared radiation.

26. The calibration device according to claim 25, wherein the radiation source is an incandescent lamp.

27. A calibrating device for calibrating a system according to claim 23, the calibration device having at least one radiation source, which source emits visible radiation as well as infrared radiation.

28. The calibration device according to claim 27, wherein the radiation source is an incandescent lamp.

29. Method of visualizing an environment of a vehicle in darkness, the method comprising the acts of:
providing, by a visual camera, a visual image or its digital data of the environment, preferably a colored visual image, the visual image showing visible objects;
providing, by an infrared camera, an infrared image or its digital data of the environment, the infrared image showing the infrared radiation emanating from the visible and/or other objects; and
merging or superposing, by a superposing or merging device, the visual image and the infrared image, during which a merged image is created which has at least a first area which shows a portion of the visual image and a portion of the infrared image, and has at least a second area which is formed by the merging of another portion of the visual image and of the corresponding portion of the infrared image;
wherein the distance between the vehicle and a vehicle driving in front of it is determined by a transmitting and receiving device and it is checked by the superposing or merging device whether the actually used distance-dependent adaptation parameter is suitable for the determined distance for providing a ghost-image-free merged image and, in the event of a lacking suitability, only the corresponding portion of the visual image or of the infrared image is partially illustrated in the merged image.

30. Method of visualizing an environment of a vehicle in darkness, the method comprising the acts of:
providing a visual image or its digital data of the environment, preferably a colored visual image, the visual image showing visible objects; and
providing an infrared image or its digital data of the environment, the infrared image showing the infrared radiation emanating from the visible and/or other objects;
wherein the visual image or its digital data are provided by a visual camera sensitive in a visual spectral range, preferably a color-sensitive visual camera, or a first sensor, and the infrared image or its digital data are provided by an infrared camera sensitive in the infrared spectral range or a second sensor;
wherein the visual camera or the first sensor or its lens system has a first optical axis, and the infrared camera or the second optical sensor or its lens system has a second optical axis, which are offset parallel to one another so that the cameras or sensors provide at least partially different cutouts of the environment of the vehicle in the form of a first and a second cutout;
wherein the visual image or a normalized visual image is aligned with respect to the infrared image or the normalized visual image or vice-versa by the processing of digital data of the images by a superposing or merging device, so that image pairs of both spectral ranges are provided which are identical with respect to time and location;
wherein a weighted superposition or averaging is carried out by the superposing or merging device for one or more pixels largely having the same location from the visual image and the infrared image; and
wherein regions with large amounts of information in comparison to regions with small amounts of information of the visual image and/or of the infrared image are weighted higher during the superposition or averaging.

31. Method according to claim 30, wherein an image repetition rate of the visual camera or of the first sensor and of the infrared camera or of the second sensor are at least largely identical.

32. Method according to claim 30, wherein same-location pixels or pixel areas of the images of the different spectral ranges which are largely identical with respect to time and location are superposed by the processing of their digital data, or that an averaging takes place.

33. Method according to claim 32, wherein brightness values and/or color values of the pixels or pixel areas are superposed or are used for an averaging.

34. Method according to claim 30, wherein the weighting takes place taking into account the brightness and/or the visual condition in the environment of the vehicle.

* * * * *